US011307285B2

(12) United States Patent
Rittenschober

(10) Patent No.: US 11,307,285 B2
(45) Date of Patent: Apr. 19, 2022

(54) APPARATUS, SYSTEM AND METHOD FOR SPATIALLY LOCATING SOUND SOURCES

(71) Applicant: Seven Bel GmbH, Leonding (AT)

(72) Inventor: Thomas Rittenschober, Leonding (AT)

(73) Assignee: SEVEN BEL GMBH, Leonding (AT)

( * ) Notice: Subject to any disclaimer, the term of this patent is extended or adjusted under 35 U.S.C. 154(b) by 0 days.

(21) Appl. No.: 16/982,108

(22) PCT Filed: Mar. 19, 2019

(86) PCT No.: PCT/AT2019/060092
§ 371 (c)(1),
(2) Date: Sep. 18, 2020

(87) PCT Pub. No.: WO2019/178626
PCT Pub. Date: Sep. 26, 2019

(65) Prior Publication Data
US 2021/0096208 A1    Apr. 1, 2021

(30) Foreign Application Priority Data

Mar. 19, 2018 (AT) .................................. 60042/2018
Jan. 16, 2019 (AT) .................................. 50033/2019

(51) Int. Cl.
| H04R 29/00 | (2006.01) |
| G01S 3/809 | (2006.01) |
| G01S 5/18 | (2006.01) |
| H04R 1/40 | (2006.01) |

(52) U.S. Cl.
CPC ................ *G01S 3/809* (2013.01); *G01S 5/18* (2013.01); *H04R 1/406* (2013.01); *H04R 29/008* (2013.01)

(58) Field of Classification Search
CPC ...................................................... H04R 29/00
See application file for complete search history.

(56) References Cited

U.S. PATENT DOCUMENTS

| 10,102,589 B1 * | 10/2018 | Tofte | H04N 7/185 |
| 10,343,287 B2 * | 7/2019 | Liu | G10L 25/84 |
| 10,848,865 B2 * | 11/2020 | Zhu | H04R 3/005 |
| 2017/0220036 A1 * | 8/2017 | Visser | H04R 29/004 |
| 2019/0324284 A1 * | 10/2019 | Haseltine | G02B 30/56 |
| 2020/0064438 A1 * | 2/2020 | Swanson | G01S 5/20 |

FOREIGN PATENT DOCUMENTS

| CN | 104459625 A | 3/2015 |
| CN | 108983148 A | 12/2018 |
| JP | S62169069 A | 7/1987 |

* cited by examiner

*Primary Examiner* — Olisa Anwah
(74) *Attorney, Agent, or Firm* — Murphy, Bilak & Homiller, PLLC

(57) ABSTRACT

An apparatus comprising at least one first microphone (10) which is movably arranged, at least one second stationary microphone (11) and at least one sensor (16) is described. The microphones can capture the sound waves emitted by acoustic sources, and the sensor can capture spatial coordinates of the first microphone. A corresponding method and a system having the apparatus mentioned are also described.

23 Claims, 3 Drawing Sheets

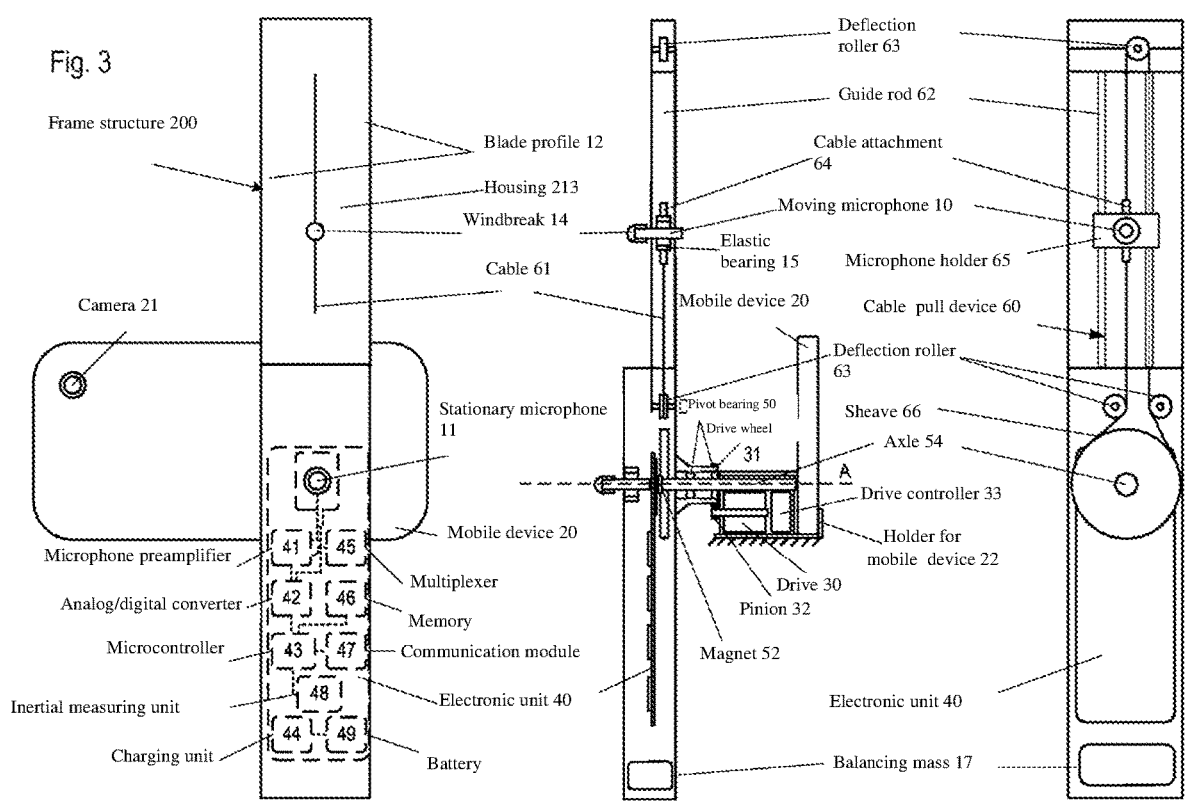

APPARATUS, SYSTEM AND METHOD FOR SPATIALLY LOCATING SOUND SOURCES

TECHNICAL FIELD

The present invention relates to an apparatus, to a system and to a method for spatially locating sound sources and it should therefore be assigned to the field of acoustic measurement technology.

BACKGROUND

Spatially locating acoustic sound sources is an essential task in quantifying noise and vibration characteristics of products in the automotive and aerospace sectors as well as in the consumer electronics and industrial equipment sectors. In the product development process, this task is referred to as Noise, Vibration, Harshness (NVH) Testing. In order to develop products which satisfy both regulatory and client requirements with regard to noise limits and sound perception, NVH Testing is indispensable and, accordingly, products must be measured with appropriate reliability and accuracy. Locating sound sources is not limited only to products of the aforementioned industry sectors but is also used in other sectors such as, for example, environmental noise measurement at the workplace, in public areas for the identification of acoustic interference sources or in the building acoustic evaluation of sound insulations. Users of systems for spatially locating acoustic sources include manufacturers of products from the aforementioned industry sectors, engineering service providers, building acousticians, construction companies and public institutions.

In particular, the verification of regulatory requirements and desired sound qualities occurs relatively late in the product development process. At this point, product developers need tools which are simple to use and intuitive and which assist in the analysis of NVH problems and decision making with regard to meeting product specifications. Problems in a similar context can be found in the sector of building acoustics in the in situ verification of construction projects, in quality monitoring in the manufacture of products, and in the status monitoring of machines and processes.

From the prior art, so-called acoustic cameras are known, by means of which acoustic sources can be visualized. Typically, such acoustic cameras have a microphone array with a large number of microphones arranged on a disk-shaped surface. The design of such acoustic cameras is frequently complex, and, in particular, a large number of microphones connected to powerful systems for parallel data acquisition and processing is generally necessary.

The aim that the inventor set is to provide an apparatus for spatially locating and visualizing acoustic sources and for the visualization thereof, which, for example, can provide intrinsic technical advantages in image quality in comparison to the prior art, in particular in the area of contrast range, local resolution and maximum representable frequency of the sound sources, and, which, in addition, is particularly easy to handle and is produced cost effectively due to the reduced technical complexity.

SUMMARY

The aforementioned aim is achieved by an apparatus according to claims 1 and 18, by a system according to claim 7 and by a method according to claims 10, 13 and 31. Different embodiment examples and developments are the subject matter of the dependent claims.

An apparatus which comprises at least one movably arranged first microphone, at least one second stationary microphone and at least one sensor is described. The microphones can capture the sound waves emitted by acoustic sources, and the sensor can capture spatial coordinates of the first microphone.

In addition, a system with a corresponding apparatus is described, which comprises a stationary data processing device, on which the apparatus is rotatably mounted about the rotation axis. The data processing device can receive measurement data from the apparatus and represent acoustic source strengths of the object to be measured.

A method according to one embodiment example comprises the steps: providing a rotatably mounted apparatus with at least one first movably arranged microphone and with at least one second stationary microphone; rotating the apparatus about a rotation axis, wherein the first microphone rotates along with it and the second microphone remains stationary; capturing, by the first and the second microphones, sound waves emitted by the object to be measured and simultaneously capturing spatial coordinates of the first microphone; computing and mapping source strengths of the sound-emitting object based on the captured measurement data.

The invention also describes a method and an apparatus for the imaged representation of acoustically emitting objects by recording (i) acoustic variables of the sound field with a moving sensor and a stationary sensor, (ii) path coordinates of the moving sensor and (iii) an optical representation of the scene to be measured by a camera, and by recording the data in an electronic unit moving along with the sensor system and transmitting it to a terminal for processing the data and representing the results as an overlay of the color-coded acoustic image with the optically captured image of the object to be measured.

The apparatuses described here can be used in numerous applications, in particular for the verification of regulatory requirements and desired sound qualities of products from the automotive, aerospace, consumer electronics and industrial equipment industry sectors, but also in the sector of building acoustics, quality monitoring in the manufacture of products and in status monitoring of machines.

The concepts described here pertaining to the imaged representation of acoustically emitting objects can be useful in different applications, for example, because the expenditure for measurement means is small in comparison to known systems with comparable performance and image quality based on a sensor array and beamforming technologies. As a result of the associated cost reduction, the technology is made available to a wide circle of users. The massive reduction with regard to size and weight facilitates the transportability, and the reduced complexity reduces the setup time for the measurement and increases the reliability during operation.

In some applications the concepts described here are advantageously used, since, in comparison to known sensor array and beamforming techniques, the quantity of data that needs to be processed is reduced by one to two orders of magnitude, and thus the requirements for the hardware to be used for data acquisition and processing are significantly reduced, and the result can be computed significantly more rapidly in the form of a mapping of acoustic sources.

BRIEF DESCRIPTION OF THE FIGURES

The invention is explained below in further detail in reference to examples represented in the figures. The representations are not necessarily true to scale, and the invention is not limited only to the represented aspects. Instead, emphasis is placed on representing the principles underlying the invention. Concerning the figures:

FIG. 3 shows an alternative embodiment example of the apparatus in a front view (left, including block diagram of the electronic unit), a cross-sectional representation (middle) as well as a rear view (right, without housing cover and drive).

DETAILED DESCRIPTION

Figure 1:
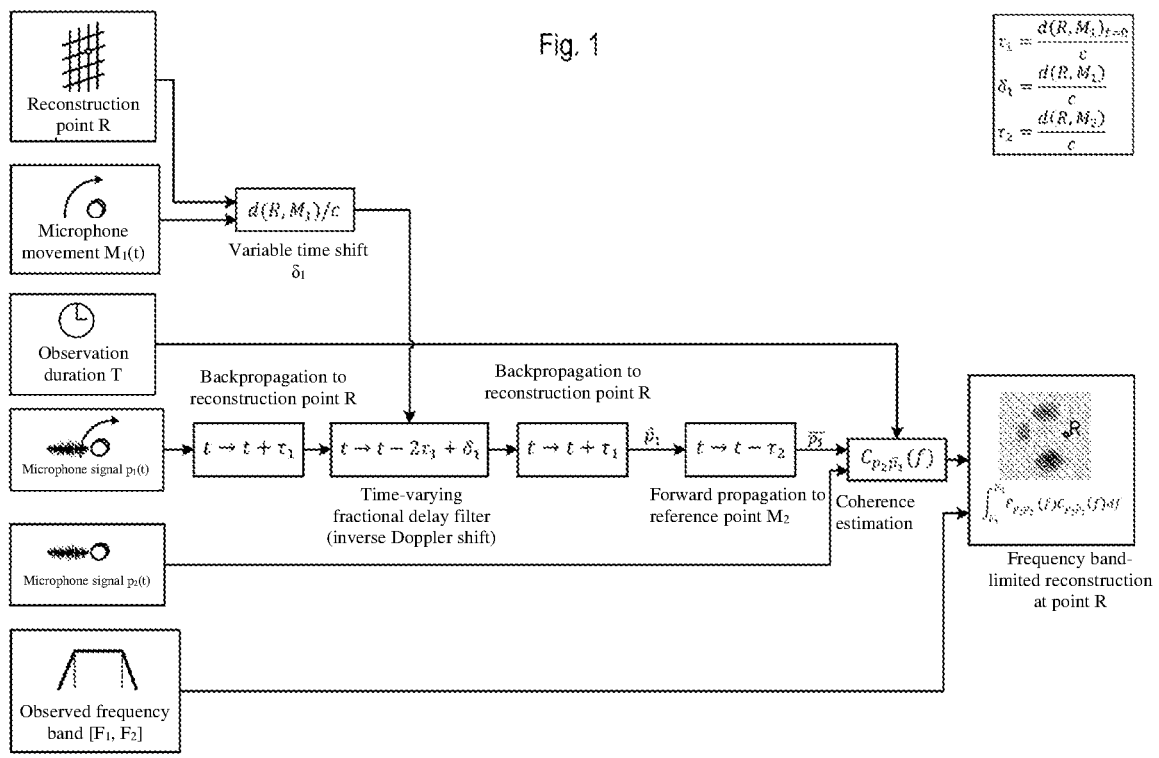
FIG. 1 illustrates, by means of a block diagram, an example of a method for computing a mapping of acoustically emitting objects based on the measurement of acoustic variables and measured properties of the sensor movement.

The present invention relates to the problem of spatially locating acoustic sources, referred to as the "Direction of Arrival" (DoA) problem in the literature. It should be mentioned that the DoA problem and associated solutions can be relevant in almost any situations in which the underlying physics is characterized by wave propagation, for example, radar, sonar, seismology, wireless communication, radioastronomy, imaging methods in medical technology, acoustics, etc. In the case of acoustics, the problem consists in reconstructing, based on the measurement of physical variables of the sound field (for example, by means of microphones), the direction or position of acoustic sources with respect to the position and orientation of the observing measurement system.

The measurement means and methods described here are combined in commercially available solutions with a video camera, with a data recorder with connection to sensors and with a computer for implementing algorithms for the reconstruction of the acoustic representation, see, for example, the system description in the publication WO 2004/068085 A2.

The following physical variables and associated sensor technologies are considered in commercially available solutions for sound source locating: pressure (omni-directional pressure microphone); acoustic particle velocity (hot wire microphone); sound intensity (two-microphone technique); refractive index of air (laser Doppler vibrometer); transverse speed of reflective surfaces (laser Doppler vibrometer). Also described in the scientific literature is the measurement of the transverse speed of an optically reflecting and acoustically transparent membrane by means of a laser Doppler vibrometer for spatially locating acoustic sources. Usually, the physical variables captured with the different sensor technologies are electrically converted, captured with corresponding single- or multi-channel data acquisition systems, preprocessed, and finally supplied to the measurement method itself.

For the further consideration, the classification of the methods into a first group of multiple stationary, time-synchronized sensors (for example, microphones), referred to as sensor array in the literature, and a second group of methods with one or more moving, time-synchronized sensors is appropriate. Depending on the application, sensor arrays can have one-, two- or three-dimensional geometric arrangements, for example, linear, annular, cross-shaped, spiral, spherical, regularly or randomly distributed in a plane or in a volume. A variant in the form of a wheel with laterally offset spokes is described in the publication U.S. Pat. No. 7,098,865 B2 (original publication DK 174558 B1). The configuration of an array with regard to the distances of the sensors from one another or the spatial extension of the array (aperture) is crucial in all the methods below for the achievable spatial resolution, the suppression of artifacts, and the maximum capturable frequency content of the acoustic sources to be measured.

Beamforming refers to a signal processing technique which, in a first step, corrects the time offset due to the different travel time from the acoustic source to the respective sensor in the array with respect to the focal point in consideration, and which, in a second step, sums up all the time-corrected signals. The output signal of the beamforming algorithm is thus strengthened in terms of its amplitude if acoustic signals come from the direction of the focal point in consideration or weakened if they come from other directions. Beamforming thus corresponds to a spatial filtering of acoustic signals. The algorithmic linking of sensor signals in the described manner is also referred to as "Delay and Sum" or "Steered Response Power" (SRP) algorithm.

The first step in the signal processing of the sensor signals, namely the time correction with respect to the focal point, can be replaced by a filter, in order to optimize the ratio of received signal power to signal noise. The associated methods are referred to as "superdirective beamforming" and "adaptive beamforming." The method can also be applied to moving acoustic sources, for example, passing trains, cars, or rotating objects in mechanical engineering.

Near field acoustic holography (NAH—Near field Acoustic Holography) of sound-emitting objects generates a mapping of sound sources on a surface based on measurements with a sensor array with a chessboard-like arrangement of the sensors in a source-free region, wherein the array is oriented transverse to the propagation direction of the sound and should cover most of the emitting surface. In the case of measurement with pressure microphones, the acoustic pressure in the source plane is determined by inverse Fourier transformation of the (two-dimensional) spatial Fourier transform of the acoustic pressure distribution in the measurement plane (hologram plane) multiplied by a function which describes the phase rotation of the hologram plane in any parallel, source-free plane. This computation methodology makes it possible to reconstruct the acoustic particle velocity and the acoustic intensity by the Euler equation. The so-called Patch NAH method addresses the problem of the measurement of large surfaces and structures, wherein the surface to be measured is subdivided into smaller surfaces (Patches). An expansion of the NAH method consists of the NAH-based boundary element method (IBEM (Inverse Boundary Element Method) based NAH), in which the Helmholtz integral theory is applied, in order to compute the effect of acoustic sources on an envelope on points in the interior of the volume in consideration. An approximation of the above-mentioned method is known in the literature as "Helmholtz Equation, Least Squares" (HELS), wherein the acoustic field is approximated by permissible base functions having a quality function with respect to the least square error.

Time Difference of Arrival (TDOA) refers to a two-step method, in which, in a first step, for a sensor array, the time delay between sensor signals of respective spatially adjacent sensor pairs is determined by cross correlation. From the knowledge of the paired time delays and spatial positions of the sensors, curves or areas are generated, and the intersection of the curves or areas resulting from an optimization problem is determined as estimated position of the sound source.

The Multiple Signal Classifier (MUSIC) algorithm belongs to the group of the subspace (Subspace) methods and enables the identification of multiple harmonic acoustic sources (narrow band) with high spatial resolution. Based on a linear mapping consisting in columns of so-called "steering" vectors which map the signals of multiple previously defined spatial sources at a certain time onto the measurement signals of a sensor array at a certain time, the spatial spectrum of the source distribution is computed by partitioning the cross correlation matrix of the sensor signals into mathematical subspaces and eigenvalue computation. The peaks in the spectrum correspond to the directions from which the sound of the sources parametrized in the model arrive. ESPRIT (Estimation of Signal Parameters via Rotational Invariance Technique) is an adaptation of the above-mentioned subspace method with the objective of reacting less sensitively to variations regarding position, amplification and phase errors of the sensors.

The time synchronized, spatial sampling of the sensor signals of a sensor array in circular form induces a Doppler effect in the synthesized signal. The time-discrete Teager-Kaiser operator can be used in order to analyze the modulations and in the case of a plane to analytically compute the direction of the arriving sound. The locating of multiple sources, and thus the computation of the spatial spectrum of the source distribution, is implemented by determining a probability density function based on the evaluation of individual time periods. Alternatively, the Center of Gravity Algorithm can be used in order to reduce the noise sensitivity and limitations in the actually usable frequency domain.

In the publication U.S. Pat. No. 9,357,293 B2, a frequency domain method based on the sampling of microphone signals of virtually moving subapertures of a linear array with a large number of sensors is presented. Due to the movement of the subapertures at different speeds along the array, frequency dependently, different signal overlaps as a function of the position of the acoustic sources are generated. This information on the different mixtures and signal energies in the frequency spectrum in the case of different movements of the subapertures can be used in order to finally derive the position of acoustic sources at a certain frequency.

In the so-called "Light refractive tomography," one computes, by means of a laser scanning vibrometer, the change in the refractive index of the medium in which the sound field propagates along the laser beam reflected on a rigid reflector. The orientation of the laser beam here is transverse to the propagation direction of the sound field. As an expansion, computer tomographic methods can be used in order to reconstruct the cross-sectional image of the acoustic field in the plane in which the change in the refractive index is computed.

Below, methods with single or multiple moving sensors are discussed for the exploitation of the Doppler effect.

By means of a movement, known beforehand, of an acoustic sensor on a circular path, a single acoustic source positioned in the space with constant frequency and amplitude is located by Phase Lock Loop (PLL) demodulation of the phase modulation of the observed signal.

According to the publication U.S. Pat. No. 2,405,281 A, the direction from which dominant acoustic or electromagnetic waves arrive can be identified based on the Doppler effect by means of a sensor moving on a circular path. Here, the measured bandwidth of the Doppler history of a harmonic source reaches a maximum when the rotation plane of the sensor is orthogonal to the direction of reception of the source. Additional publications on the identification of single dominant acoustic sources by moving one or more microphones using the Doppler effect are EP 2 948 787 A1 and EP 2 304 969 B1.

The use of beamforming for the spatial filtering of sound waves hitting a sensor array (with evenly distributed sensors) has the limitation that the maximum (critical) frequency of acoustic sources that can be captured is defined by the spacing of two adjacent sensors of an array. The attempt to locate acoustic sources beyond this frequency leads to the generation of so-called "ghost images" in the reconstructed acoustic image and is referred to as spatial aliasing effect in the literature. The use of a sensor array with fixed arrangement of sensors beyond the critical frequency and the associated suppression of spatial aliasing artifacts can be achieved by spatial movement of the sensor array. The point spread function (point spread function) of the mapping system consisting of a sensor array moving on a circular path with constant angular speed can be simulated by a Delay and Sum algorithm, and the suppression of aliasing artifacts can be verified experimentally with a single harmonic sound source.

As mentioned already at the beginning of this section, also worthy of mention are methods for locating sources or reflective structures which are not used directly in acoustics but of which the underlying physics is characterized by wave propagation. Thus, a synthetic aperture radar (Synthetic Aperture Radar (SAR)) can yield a mapping of a surface, in that the electromagnetic field which is generated by a moving transmitter with known position is sampled. The movement of the transmitter relative to the surface introduces a Doppler effect in the collocated receiver. By correlation of the measured Doppler history, i.e., the time course of the Doppler frequency of the echo of an object from at-first-positive values to negative values, with so-called replicas (i.e., Doppler histories generated based on the knowledge of the movement of the transmitter for each distance as a result of punctiform reflectors), a high-resolution image of the sampled surface is reconstructed.

The underlying idea of the new concepts described here is the reduction of the metrological expenditure for capturing sound field information to a minimum, with simultaneously improved quality of the spatial mapping of acoustic sources, in particular with regard to the contrast range, the spatial resolution and the maximum representable frequency. Measurement methods which require a sensor array have the inherent disadvantage of using of a plurality of sensors in order to achieve a usable spatial resolution with acceptable contrast range and a more reasonable upper limit frequency.

Both in beamforming and in acoustic holography, the spatial resolution is described by the aperture size of the array and by the maximum representable frequency, and the field of view is described by the distance of the sensors from one another. An improvement of the spatial resolution thus requires an increase in the number of sensors on the measurement surface.

The TDOA method allows only the identification of the most dominant source, and the MUSIC/ESPRIT methods have limitations in the number of identifiable sources, the upper limit of which is set by the number of sensors used. Both in TDOA and in MUSIC/ESPRIT, the measurement of a sound field with an unknown number of acoustic sources can lead to erroneous interpretations. The DREAM (Discrete Representation Array Modelling) method requires multiple passes in order to characterize, in a first step, the signal spectrum of the acoustic sources and finally in a second step to determine therefrom the size and speeds of the subaperture of a linear array. Due to the sequential procedure for determining the configuration, the method for measuring acoustic specific events cannot be used without a priori information.

The mentioned method of Light Refractive Tomography challenges the measurement technician to create a vibration-free environment for the laser scanning vibrometer and the rigid reflector, since the change in the refractive index of the medium due to the sound field is typically lower by several orders of magnitude than the vibration level of the causative source. As in beamforming and acoustic holography, an array of laser Doppler vibrometers along the circumference of the sectional image to be reconstructed is necessary in order to achieve a usable spatial resolution. Due to the complexity of the measurement means used, the metrological expenditure for implementing an array with laser Doppler vibrometers several orders of magnitude higher than for pressure and sound velocity sensors.

The methods which use the demodulation of a phase modulation of the observed signal of a sensor moving in a circle as a rule work only for the identification of a harmonic source with constant amplitude and frequency or of a dominant stationary source.

FIG. 1 illustrates in a block diagram an example of a signal processing method which, in the embodiment examples described here, can be used for determining a mapping of sound emitting objects (so-called acoustic images, in which the sound pressure is, for example, color coded). The embodiment examples described in further detail below each use a sensor (for example, microphone) with known fixed position $M_2$ and one or more sensors moving along a circular path. In the present example, a moving microphone is considered, the movement of which, circular or spiral, for example, is described by the time-dependent position $M_1(t)$. However, the trajectory $M_1(t)$ does not necessarily have to run along a circular path or a spiral path. But in the case of circular or spiral trajectories, the instantaneous position $M_1(t)$ can be determined relatively easily by means of an angle sensor (rotary encoder).

As input variables of the method, the following variables are considered: (i) a reconstruction point R described by spatial coordinates with respect to a coordinate system, the origin of which is at the site $M_2$ of the stationary sensor; (ii) the sensor signals of the moving first sensor (microphone signal $p_1(t)$) and of the stationary second sensor (microphone signal $p_2(t)$); (iii) the movement $M_1(t)$ of the first moving sensor described by spatial coordinates with respect to the coordinate system, the origin of which is at the site of the stationary sensor; (iv) the observation duration T which is defined by the complete scanning of the aperture (for example, one rotation performed by the sensor guided on a circular path) and which determines the time windowing of the time signals for the transformation into the frequency domain; and (v) the observed frequency band $[F_1, F_2]$.

In a first step, the time signal $p_1(t)$ of the moving sensor at $t=0$ is temporally backpropagated (time-shifted backward) with value $\tau_1 = d(R, M_1)_{t=0}/c$ into the reconstruction point R, wherein $d(R, M_1)$ designates the distance between the reconstruction point R and the position of the moving sensor, and c represents the propagation speed of disturbances in the medium in consideration (speed of sound). In a second step, the time signal $p_1(t+\tau_1)$ is time-shifted by a time-varying Fractional Delay filter with a variable time delay $2\tau_1 - \delta_1$. The time-varying time delay $\delta_1 = \tau_1 + \delta\tau(M_1)$ designates the difference in time which the acoustic disturbance takes in the medium in consideration to go from the reconstruction point R to the site $M_1$ of the moving sensor. $\delta\tau$ is a function of the position of the moving microphone $M_1$. In a third step, as in the first step, the time signal is temporally backpropagated (by the value $\tau_1$) into the reconstruction point R. The resulting time signal $\hat{p}_1(t)$ then represents an acoustic signal which is emitted at the reconstruction point R by a virtual sound source (acoustic monopole), and this time signal $\hat{p}_1(t)$ is subsequently forward propagated (time-shifted forward) in a fourth step into the site $M_2$ of the stationary sensor with time delay $\tau_2 = d(R, M_2)/c$, wherein $d(R, M_2)$ designates the distance between the reconstruction point R and the position of the stationary sensor. For an actually emitting source at the reconstruction point R, the time-variable Doppler shifts caused by the movement $M_1$ of the first sensor are compensated. Thus—for an emitting source at the reconstruction point R—the resulting time signal $\bar{p}_1(t)$ is the spatial mapping of the time signal $p_1(t)$ of the moving sensor onto the position $M_2$ of the stationary sensor. Time signal contributions of actually emitting sources apart from the reconstruction point R additional time-variable Doppler shifts.

By means of the time signals $p_1(t)$ and $\bar{p}_1(t)$, the coherence estimation $C_{p_2\bar{p}_1}(f)$ is then determined in the frequency domain based on the spectral-power density functions $P_{p_2 p_2}(f)$ and $P_{\bar{p}_1\bar{p}_1}(f)$ as well as the cross power density function $P_{p_2\bar{p}_1}(f)$, wherein $$C_{p_2\bar{p}_1}(f) = \frac{|P_{\bar{p}_1 p_2}(f)|^2}{P_{\bar{p}_1\bar{p}_1}(f) P_{p_2 p_2}(f)}$$

The estimated coherence $C_{p_2\bar{p}_1}(f)$ can then be multiplied by the spectral power density functions $P_{p_2 p_2}(f)$ and thus be evaluated by integrating for an observed frequency band—defined by a lower frequency $F_1$ and an upper frequency $F_2$ of the frequency band in consideration—according $$Q = \int_{F_1}^{F_2} P_{p_2 p_2}(f) C_{p_2\bar{p}_1}(f) df.$$

The amount Q defined in this manner corresponds to the contribution of the source emitting from the reconstruction point R in the frequency band $[F_1, F_2]$ to the signal power measured at the site $M_2$ of the stationary sensor. This contribution is in relation to the signal power at the reference point $M_2$ (site of the stationary microphone) and can be indicated, for example, in dB.

While FIG. 1 shows the reconstruction of the acoustic sound strength at a reconstruction point R in space, the broadening of this concept to an arbitrarily shaped surface succeeds by spatial discretization of the surface into a plurality of reconstruction points and computation of the acoustic source strengths at the respective discrete reconstruction points. Subsequently, the representation of the computed source strengths at the reconstruction points can be overlaid with an optically captured image of the measurement scene (for example, by a camera), in order to enable a spatial association. In an embodiment example, the surface on which the reconstruction points lie can be an image plane lying for example, perpendicularly to a rotation axis, about which the moving microphone rotates and which lies at a defined, settable distance from the stationary microphone.

Figure 2:
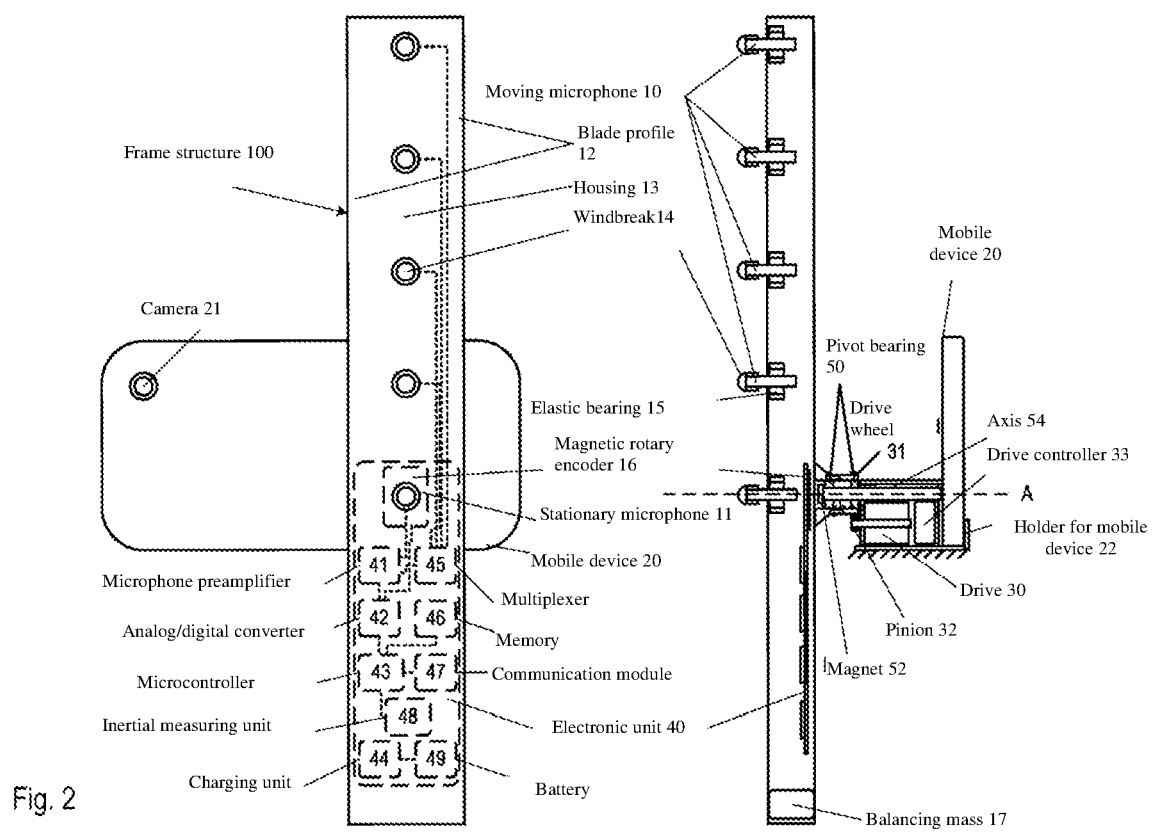
FIG. 2 shows a first embodiment example of an apparatus in a front view (left, including block diagram of the electronic unit) as well as in a cross-sectional representation (right).

FIG. 2 shows a system for locating and mapping acoustic sources and the strength thereof in a measurement scene with one or more sound sources. The system comprises an apparatus which is designed as a movable frame structure 100 and, connected thereto, a stationary data processing device which can be a mobile device 20 (mobile device) with a camera 21 (for example, a smartphone or a tablet PC). Additional types of data processing devices capable of receiving and sending a wired or wireless communication connection and capable of representing images can also be used.

According to an embodiment example, the frame structure 100 is rotatably mounted about a (stationary) axle 54 (axle 54 with rotation axis A). At the center of rotation, i.e., on the rotation axis A, the above-mentioned stationary microphone 11 (position $M_2$) is arranged, while along a longitudinal axis of the frame structure 100, multiple microphones (for example, electronically multiplexed microphones) 10 are arranged. The mentioned longitudinal axis of the frame structure 100 is perpendicular to the rotation axis A, wherefore, when frame structure 100 is rotated about the axle 54, the microphones 10 move on a circular path about the rotation axis A. In the frame structure 100, an electronic unit 40 can also be arranged, by means of which the microphones 10 and 11 are connected. Instead of a rigid axle 54, a rotating shaft with rotation axis A can also be used.

For the energy supply, the electronic unit 40 can comprise a battery 49 which supplies the remaining components of the electronic unit with a supply voltage. The charging unit 44 is used for charging the battery 49. However, other forms of voltage supply are also possible. According to the example represented in FIG. 2, the electronic unit 40 also comprises (i) a (for example, magnetic or optical) rotary encoder 16 for determining the angular position of the frame structure 100 with respect to the rotation axis A, (ii) a microphone amplifier 41 for the analog preamplification of the sensor signals $p_2(t)$ and $p_1(t)$ of the stationary microphone 10 and of the moving microphone 11, (iii) a data acquisition device (analog/digital converter 42, memory 46) for digitizing and storing the sensor signals of the microphones 10, 11 and of the rotary encoder 16, (iv) an electronic multiplexer 45 for selecting the moving microphone 10 connected to a data acquisition device, and (v) a module 47 for the wireless transmission of the captured data to the mobile device 20 for the purpose of further processing the measurement data or analysis by the user. A microcontroller 43 controls the multiplexer 45, the analog/digital converter 42, the data flow and the data transmission. For capturing the spatial coordinates $M_1(t)$ of the moving microphones, other sensor systems can also be used, such as, for example, systems comprising an angular speed sensor and a triaxial acceleration sensor or motion tracking systems for direct capturing of the movement.

The mobile device 20 with integrated camera 21 is oriented with its optical axis parallel to the rotation axis A, receives the digitized measurement data wirelessly from the electronic unit 40 and transmits said data for example via a wireless network connection to a cloud computing service for the computation of the acoustic mapping according to the method described above in reference to FIG. 1, and overlays the results computed (by the cloud computing service) with the optical image, acquired by the camera 21, of the measurement scene with the sound sources contained therein. The computations are outsourced to a cloud computing service in order to reduce the load on the power consumption of the mobile terminal, inter alia, to continuously and permanently store data in the case of continuous measurements, to facilitate the accessibility of the data to other users with appropriate access rights, as well as to enable the web-based incorporation of the sensor in any metrology and control systems. The outsourcing of the computation power moreover does not necessarily have to occur with a cloud computing service, the computations can instead also be carried by any other computer (for example, a workstation) connected to the mobile device 20.

The rotation of the frame structure 100 can occur via a manual drive or an electric drive 30 (electric motor). As an alternative, a drive by a mechanical spring mechanism would also be possible. In the represented example, the force transmission of the drive 30 is implemented via a drive wheel 31 which is rigidly connected to the frame structure 100 and rotatably mounted on the axle 54. The axle 54 and the drive 30 are stationary and mounted, for example, on the holder 22. The drive wheel 31 is driven, for example, by a pinion 32 on the drive shaft of the electric motor. A controller for actuating the electric motor 30 including a battery or a connection for an external electrical energy supply is integrated in the holder 22. The holder 22 can be arranged, for example, on a tripod (as also used, for example, for cameras).

In an embodiment example, the housing 13 (i.e., the outer casing) of the frame structure 100 can have a cross section (normal to the longitudinal axis of the frame structure 100) in the shape of an aerodynamic blade profile 12. This has the advantage that no aeroacoustic sources are generated due to the rotation of the frame structure 100 or their generation is at least strongly reduced. In the present embodiment example, four microphones 10 are arranged on the frame structure 100, which rotate along with the frame structure 100. As mentioned, the microphone 11 is located in a position on the rotation axis and therefore does not change its position. The microphones 10, 11 are arranged along the longitudinal axis of the frame structure 100, wherein a distance between two adjacent microphones in each case can be equal (which does not necessarily have to be the case). In the represented example, the moving microphones 10 are arranged on one side of the frame structure 100, while the electronic unit 40 and a balancing mass 17 are arranged on the other side of the frame structure 100. The balancing mass 17 can be dimensioned and positioned so that the frame structure 100 which itself is asymmetric has no imbalance during a rotation about the rotation axis A. In a symmetric design of the frame structure as well, a balancing mass 17 will as a rule be necessary, since the masses of the components fastened to the frame structure 100 are not symmetric with respect to the rotation axis.

According to the example represented in FIG. 2, the microphones 10, 11 are fastened via an elastic bearing 15 on the frame structure 100. The elastic bearing 15 can help to mechanically uncouple the microphones 10, 11 from the frame structure 100 and prevent the transmission of vibrations, caused, for example, by the drive 30 or the pivot bearing 50, to the microphones. In other words, the elastic damping mount of the microphones 10, 11 brings about an interruption of the mechanical vibration path to the microphones. In the represented example, on the housing 13 of the frame structure 100, windbreak elements 14 can be provided, which cover the microphones 10, 11 in order to suppress the coupling of wind noise and signals of other acoustic sources into the sensor signals as a result of the movement of the frame structure 100. Depending on the application, these windbreak elements 14 are optional.

In summary, the function of the embodiment example shown in FIG. 2 can be described as follows: During a rotation of the frame structure 100 about the axis A, the stationary microphone 11 does not change its position, while the other microphones 10 follow a circular path. The microphones 10, 11 capture the sound waves emitted by acoustic sources in the form of a sound pressure, while the rotary encoder 16 captures the spatial coordinates of the moving microphones 10. The spatial coordinates are defined by the angular position of the frame structure 100 and the (fixed) position of the microphones 10 relative to the frame structure 100. The sensor signals obtained are received by the electronic unit 40, digitized and transmitted to the mobile device 20. As explained above, said mobile device can itself compute the source strengths of the sound sources present on the measured object based on the received measurement data or it can outsource the computation to an external computation unit. The camera 21 captures an optical image of the object to be measured (or of multiple objects), with which the computed source strengths can be overlaid, in order to obtain a visual representation and association of the acoustic sources and their source strengths with the optical camera image. For example, the optical image can be taken in black and white and the source strength can be color coded in the image.

FIG. 3 shows another embodiment of a system for locating and mapping acoustic sources on an object to be measured. The system according to FIG. 3 differs from the system according to FIG. 2 only in the design of the frame structure 200. Instead of the four microphones 10 which can move along a circular path, only one moving microphone 10 is provided in the present example, which is mounted so that it can be radially moved on the frame structure 200 (along the longitudinal axis thereof). The distance between the microphone 10 and the rotation axis (and thus the radius of the circular movement of the microphone 10) can thus be varied. Other arrangements of the microphones, in particular with multiple movably mounted microphones 10, are also possible.

By a change (increase or reduction) of the radial distance between the microphone 10 and the rotation axis A while the frame structure 200 rotates, the microphone 10 effectively performs a spiral-shaped movement about the rotation axis A. A settability of the distance between microphone 10 and the rotation axis A (that is to say the position of the microphone 10 relative to the frame structure 200) can be achieved, for example, by a cable pull device 60. Here, a cable 61 can be connected to a microphone holder 65, which is mounted so that it can be shifted linearly on the frame structure 200. For this purpose, the frame structure 200 can comprise, for example, two guide rods 62 which are substantially parallel to the longitudinal axis of the frame structure and on which the microphone holder 65 can slide. Thus, the guide rods 62 together with the microphone holder form a linear guide for the microphone 10. The cable 61 in the represented example is guided around multiple deflection rollers 63 as well as around a sheave 66 rigidly connected to the axle 54. In the represented example, the cable runs partially through one of the (hollow) guide rods 62.

When the frame structure 200 is rotated about the stationary axle 54, the cable 61 is unwound on the circumference of the sheave 66, which leads to a shifting of the microphone holder 65 and consequently to an approximately spiral-shaped movement of the microphone 10, wherein the radial position of the moving microphone 10 can unequivocally be associated with a measured angular position of the frame structure; with each full rotation of the frame structure, the microphone is moved by a distance which corresponds to the circumference of the sheave 65. As in the previous example, the frame structure has a housing 213 which surrounds the cable pull device 60 consisting of cable 61, deflection rollers 63, sheave 65, guide rods 62 and microphone holder 65, and which comprises an elongate opening (slot) for the microphone 10. For the rest, the example represented in FIG. 3 is the same as the previous example from FIG. 2.

The invention claimed is:

1. A system, comprising:
an apparatus comprising at least one first microphone movably arranged and designed to capture acoustic sources in a measurement scene; a second stationary microphone designed to capture acoustic sources in the measurement scene; and at least one position sensor designed to capture the position of the at least one first microphone; and
a computation unit configured to determine an acoustic source strength at one or more reconstruction points based on sensor signals of the first microphone and of the second microphone, and also based on a captured position signal of the at least one position sensor.

2. The system of claim 1, wherein the apparatus is mountable so that the apparatus can rotate about a rotation axis, and wherein the second stationary microphone is arranged on the rotation axis so that the second stationary microphone does not change its position during the rotation.

3. The system of claim 2, wherein the apparatus has a shape of an aerodynamically shaped blade.

4. The system of claim 2, further comprising:
a balancing mass arranged in the apparatus in such a manner that the balancing mass has no imbalance when rotated about the rotation axis.

5. The system of claim 1, further comprising:
an electronic unit designed to process the sensor signals which are supplied by the at least one first microphone, the second stationary microphone and the at least one position sensor.

6. The system of claim 1, wherein the apparatus comprises a first portion and a second portion, wherein the first portion is movably mounted with respect to the first portion, and wherein the at least one first microphone is arranged on the first portion and the second stationary microphone is arranged on the second portion.

7. A system, comprising:
a holder;
an apparatus comprising: at least one first microphone movably arranged and designed to capture acoustic sources in a measurement scene; a second stationary microphone designed to capture acoustic sources in the measurement scene; and at least one position sensor designed to capture the position of the at least one first microphone, the apparatus being mounted on the holder; and
a device configured to be fastened on the holder and designed to receive measurement data based on sensor signals from the apparatus and to visualize measurement results based on the measurement data.

8. The system of claim 7, further comprising:
a computation unit contained by the device or coupled to the apparatus via a communication connection.

9. The system of claim 8, wherein the computation unit is formed by a cloud computing service.

10. A method, comprising:
moving a first microphone relative to a fixed reference position at which a second microphone is arranged;
capturing sensor signals supplied by the first microphone and the second microphone and simultaneously capturing a position signal which indicates a position of the first microphone relative to the fixed reference position; and computing an acoustic source strength at one or more reconstruction points based on the sensor signals of the first microphone and of the second microphone, and also based on the captured position signal.

11. The method of claim 10, further comprising:

capturing an optical image which comprises one or more sound sources; and overlaying the acoustic source strengths computed for the one or more reconstruction points with the captured optical image.

12. The method of claim 10, further comprising:

transmitting captured measurement data to a computation unit, via a communication connection, wherein the computation of the acoustic source strength is carried out at the one or more reconstruction points by the computation unit.

13. A method, comprising:

capturing at least one first sensor signal by at least one first microphone which moves along a defined trajectory, and simultaneously measuring a position of the at least one first microphone relative to a fixed reference position;

capturing a second sensor signal by a second microphone located in the reference position;

determining a contribution of virtual sound sources, which are located virtually at multiple settable reconstruction points, to a measured signal power of the second sensor signal based on the first sensor signal, the second sensor signal and the measured position of the second microphone relative to the fixed reference position.

14. The method of claim 13, further comprising:

recording an image by a camera with a fixed position relative to the at least one first microphone;

associating the reconstruction points with corresponding pixels of the image; and mapping the image, wherein based on the contribution computed for the respective reconstruction point of the virtual sound source located at the respective reconstruction point, the pixels associated with the reconstruction points are colored.

15. The method of claim 13, wherein for each reconstruction point, determining the contribution of a virtual sound source comprises:

transforming the first sensor signal into a transformed first sensor signal, wherein influence of the Doppler effect caused by movement of the second microphone is compensated at least approximately;

computing the coherence between the second sensor signal and the transformed first sensor signal; and computing the contribution of the virtual sound source located at the respective reconstruction point, with respect to the measured signal power of the second sensor signal for a settable frequency band.

16. The method of claim 15, wherein transforming the first sensor signal comprises:

backpropagating the first sensor signal into the respective reconstruction point by a time span which depends on the distance between the at least one first microphone at an arbitrary starting time of a measurement and the reconstruction point;

filtering of the backpropagated first sensor signal with a time-varying fractional delay filter by a time span which represents the time which an acoustic signal takes to travel from the reconstruction point to the at least one first microphone;

backpropagating the filtered sensor signal into the reconstruction point by a time span which depends on the distance between the at least one first microphone at an arbitrary starting time of a measurement and the reconstruction point, wherein the resulting backpropagated filtered sensor signal represents an acoustic signal emitted by a virtual sound source located at the respective reconstruction point; and forward propagating the backpropagated filtered sensor signal into the reference position by a time span which depends on the distance between the reference position and the reconstruction point.

17. The method of claim 15, wherein computing the contribution of the virtual sound source located at the respective reconstruction point comprises:

integrating a product of coherence and spectral power density of the second sensor signal over the settable frequency band.

18. A method for reconstruction of acoustic source strength at an arbitrary spatial point by estimation of coherence between a time signal of a first stationary acoustic sensor and a transform of a time signal of a second moving sensor, wherein the time signal of the second moving acoustic sensor is transformed by a time shift taking into consideration a propagation speed in a medium in question to the reconstruction point, wherein a resulting signal is used for exciting a monopole acoustic source at the reconstruction point, is time-shifted by a DC component with an inverted time delay profile with respect to a time-dependent time delay between the reconstruction point and a position of the second moving acoustic sensor, and is subsequently mapped to a site of the first stationary acoustic sensor by a constant time shift, wherein a coherence function determined in the frequency domain defines a measure of the contribution of a source emitting from the reconstruction point with respect to a level measured at the site of the first stationary acoustic sensor.

19. The method of claim 18, wherein the coherence estimate in the frequency domain is evaluated at a certain frequency or integrated in a defined frequency band, to enable analyses of the acoustic source distribution in the frequency domain.

20. The method of claim 19, wherein the reconstruction of the acoustic source strength is carried out at multiple spatial points such that a representation of the acoustic source strengths on a surface of arbitrary shape is made possible.

21. The method of claim 19, wherein the representation of the acoustic source strengths is overlaid with an optically captured image of the measurement scene, to enable a spatial association.

22. The system of claim 1, wherein the apparatus is supported such that it can rotate around an axis, wherein the second microphone is located on the axis, so that it does not change its position during rotation.

23. The system of claim 22, wherein the one or more reconstruction points are in a plane which is substantially perpendicular to the axis.

* * * * *